S. W. FOWLER.
LAMP-CHIMNEY.
No. 7,463. Reissued Jan. 16, 1877.
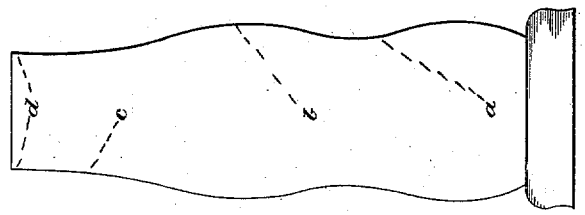
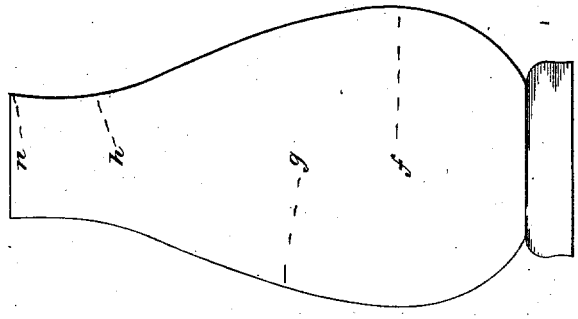
WITNESSES:
A. W. Almquist
J. H. Scarborough
INVENTOR:
S. W. Fowler.
BY Munn & Co
ATTORNEYS.
N. PETERS, PHOTO-LITHOGRAPHER, WASHINGTON, D. C.

UNITED STATES PATENT OFFICE.

SAMUEL W. FOWLER, OF BROOKLYN, NEW YORK, ASSIGNOR TO FRANK H. LOVELL AND ORVILLE D. LOVELL, OF SAME PLACE.

IMPROVEMENT IN LAMP-CHIMNEYS.

Specification forming part of Letters Patent No. 98,484, dated January 4, 1870; reissue No. 7,463, dated January 16, 1877; application filed November 27, 1876.

*To all whom it may concern:*

Be it known that I, SAMUEL W. FOWLER, of Brooklyn, in the county of Kings and State of New York, have invented a new and useful Improvement in Lamp-Chimneys, of which the following is a specification:

The nature and object of my invention are the production of a lamp-chimney of such shape that it will give all the light and allow for expansion by heat, so as to prevent breakage.

Figure 1 represents a side view of my invention. Fig. 2 represents a vertical section of the same.

Similar letters of reference indicate corresponding parts.

The chimney may be blown either in molds or otherwise.

The object of the inward curvature at *a a*, Fig. 2, is the holding of the oxygenated air to the flame, so as to produce combustion; and the outward curvature at *b b*, Fig. 2, is for the purpose of relieving the intense heat from the sides, arising from the top corners of the flame, and allowing the excessive heat to escape upward through the curvature *c c*, Fig. 2, and the outward curvature *d d*, Fig. 2, at the top, is to accelerate the escape of the heat and the admission of air to assist combustion and form a perfect light. *f* shows the widest bulge of the outline of the narrow sides; *g*, the upward incline; *h*, the neck; and *n* the diverging orifice. The chimney thus has the regular outline *f g h n* on the narrow sides, while at *a* on the broad sides are opposite indentations or re-entrant curves.

By this arrangement of outward and inward curves on the sides and edges of the lamp-chimney, it forms a perfect lamp-chimney, giving force to the light, vent to the heat, and the admission of all the necessary air.

Having thus described my invention, I claim as new and desire to secure by Letters Patent—

1. A lamp-chimney made broad in one and narrow in a transverse direction, the broad sides being depressed at the opposite points *a*, as and for the purpose specified.

2. In a lamp-chimney, the several curves *a b c d f g h n*, arranged as and for the purpose set forth.

SAMUEL W. FOWLER.

Witnesses:

LOUIS I. MICHEL,

JAS. D. WARNER.